United States Patent Office 2,747,490
Patented May 29, 1956

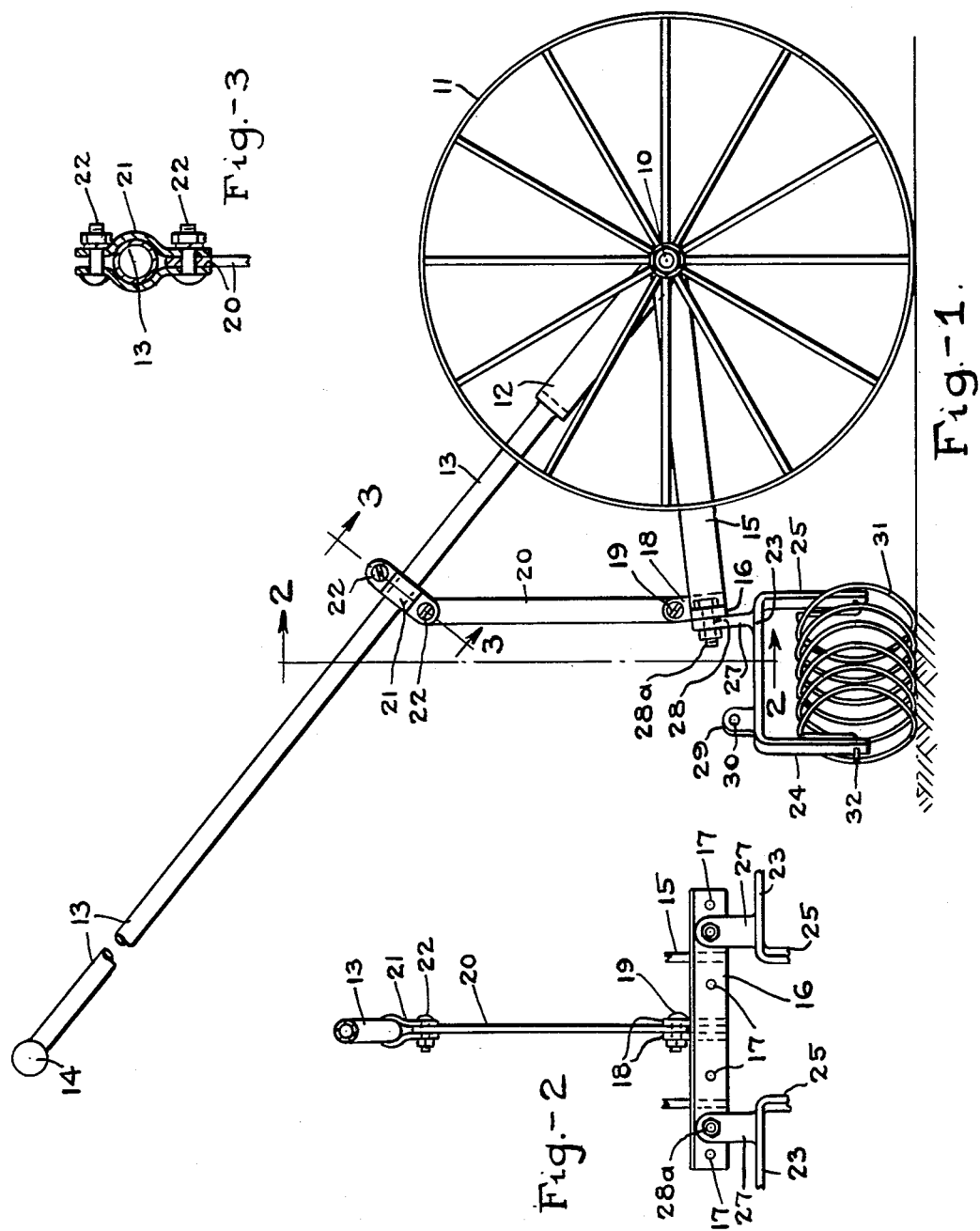

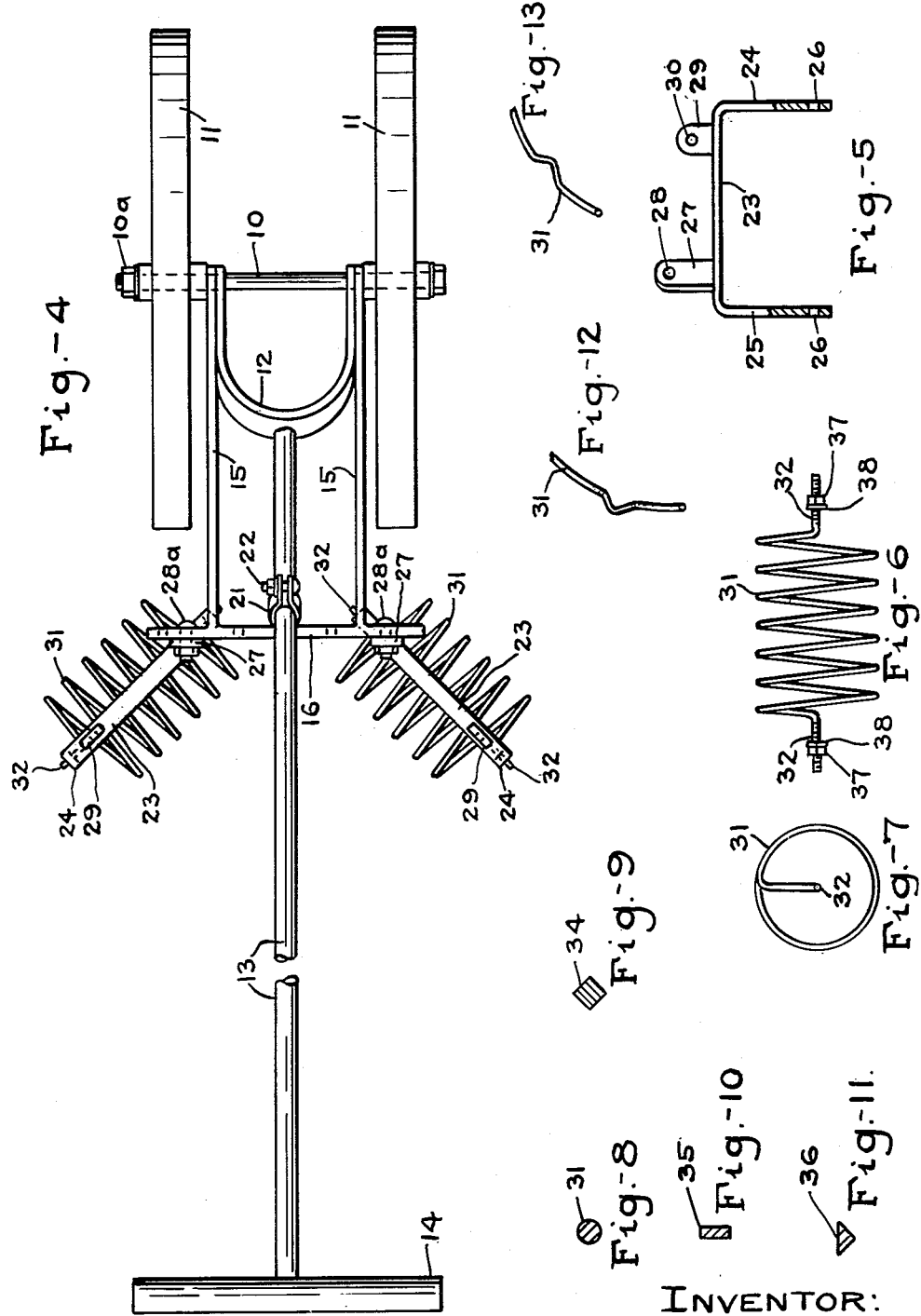

2,747,490

COIL SPRING TYPE ROW CROP CULTIVATOR

Harrison Brown, Fargo, N. Dak.

Application December 8, 1952, Serial No. 324,681

4 Claims. (Cl. 97—59)

The invention relates to coil spring type row crop cultivators which may be attached to various cultivating implements, and constructed in a manner whereby it may be adjusted to meet varying soil conditions, for instance, moisture conditions and plant growth, and constructed in a manner whereby the springs will rotate at an angle through the soil, cultivating the soil by reason of the rotary action and the side thrust which the angle provides, and will remove by pulling and lifting weeds, and give balance and guidance to the rotary cultivating elements.

An object is to provide a flexible, earth-working unit in the form of two coil springs made of tempered spring steel suspended by a forked support, which will tend to arch over any obstruction, and contract and expand upon contacting obstructions, that cause a rigid, earth-working unit to throw and force out of line a carriage supporting the unit to the damage of the plants in row crop work.

Another object is to provide a flexible earth-working unit in the form of two coil springs made of tempered spring steel suspended by a forked support so that the coils of the springs may expand or contract freely and so that the springs may move along their axis to some slight extent without the expansion or contraction of the springs themselves, making the coils more responsive to soil conditions.

A further object is to provide a device with two coil springs made of tempered spring steel suspended by a forked support rotating on their own axis and operating with their axis at right angles to the line of travel of the cultivator carriage and at any angle with said line of travel secured by turning the outer ends of the springs backward or forward from said right angle position, and which, when turned backward, will move the soil toward the plant, and which, when turned forward, will move the soil away from the plant row.

I attain these objectives by a mechanism illustrated in which Fig. 1 is a side view of the device, and in which Fig. 2 is a rear view of the handle support and the adjustable arch support of the springs, and in which Fig. 3 is a cross-section view of the clamp which attaches the support 20 to the handle 13, and in which Fig. 4 is a top view of the entire mechanism, and in which Fig. 5 is a rear view of the arch support, and in which Fig. 6 is a front view of the coil spring, and in which Fig. 7 is an end view of the coil spring, and in which Fig. 8 is a cross-section view of the round wire used in making the spring in Fig. 6, and in which Fig. 9 is a cross-section view of the square wire, and in which Fig. 10 is a cross-section view of the flat wire, and in which Fig. 11 is a cross-section view of the triangular wire, and Fig. 12 represents a portion of the curved surface of a coil spring with a V-shaped bend pointing outward from the circumference of said spring, and Fig. 13 represents a portion of a coil of said spring with a V-shaped bend in the wire, lying flat along the circumference of the spring. Similar numbers refer to similar parts throughout the several views.

The handle bar 14 is a steel tube welded to the handle shank 13, which in turn is welded to the curve part of the arch 12. Through the arch 12, on both the left and right side thereof, are drilled the holes through which the shaft or axle 10 passes. Through both of extensions 15 are drilled holes through which the shaft or axle 10 passes as it passes through the holes drilled in arch 12. The wheels 11 are placed on the shaft or axle 10 and are held against extensions 15 by the nut 10a. Welded to the ends of extensions 15 is the bar 16 to which are bolted the arches 23 by means of bolt 28a, which passes through the holes 28 and fastens extension 27 to the bar 16. The arches 23 are fastened thusly to the bar 16 when it is desired to place the springs 31 at an angle other than a right angle with the line of travel of the mechanism. In the event that the springs 31 are to be operated with their outer ends toward the front of the mechanism then the spring 31 that is on one side of the mechanism when the springs 31 are pointing toward the rear of the mechanism should be placed on the opposite side of the mechanism and attached to bar 16 by means of projection 27, and the spring 31 that is on the other side of the mechanism should be placed on the side of the mechanism from which the other spring 31 has been removed. Springs 31, with their outer ends pointing toward the rear of the mechanism will have a tendency to move the soil toward the space between the springs 31 and through which space the row of plants will pass when the springs 31 have their outer ends pointed toward the front of the mechanism then the action of the springs 31 is of such a nature as to roll the soil away from the space between the springs 31 and away from the plant row which will pass between the springs 31. In case the springs 31 are pointing toward the rear of the mechanism or in the event that the ends of the springs 31 are pointing toward the front of said mechanism, the extensions 27 on both of said arches 23 will be next to the center of bar 16.

In the event that the springs are to be operated at a right angle with the line of travel of the mechanism, then the bolt 28a is placed in the hole 30 which is drilled in the extension 29, this position bringing the extension or upright 24 on the arch 23 next to the center of bar 16 and when the springs are in the position shown in Fig. 4, then arm 25 is toward the inside. In each end 25 and 24 of the arch 23 is drilled the hole 26 and in the assembling of the mechanism the spring 31 is held in position in the arch 23 by passing the ends 32 of the spring through the holes 26. The uprights 18 appearing in Fig. 1 and Fig. 2 hold the bar 20 in place. Through the uprights 18 and the bar 20 is drilled a hole through which bolt 19 passes and which holds the parts 18 and 20 together. At the upper end of bar 20 and through the clamps 21 is drilled a hole through which the bolts 22 pass holding the sides of clamp 21 and the upright 20 together. At the opposite end of the clamp 21 is another bolt 22 which closes the clamp 21 upon the shaft 13. The bolts 22 may be released to permit the clamp 21 to slide along the surface of shaft 13 thus raising or lowering the handle or shaft 13 for the convenience of an operator. The holes 17 appearing in Fig. 2 in plate 16 are for the purpose of moving extensions 27 in Fig. 2 and extensions 29 in Fig. 5 to make an adjustment for the width of the rows which are to be cultivated and for the distance that the cultivating tool will be placed from the plant. The bolt 28a may be released so that the extensions 27 may be swung in or out. If both extensions 27 are swung in and then fixed in that position, the spring 31 will penetrate the soil next to the plant at a very shallow depth. If the extensions 27 are swung outward and the bolt 28 is fastened, then the spring 31 will penetrate the soil deeply next to the plant. In the event that the arch 23 and the spring 31 are being held in position by extension 29, extension 29 may be swung in or swung out giving the same effect as when extension 27 has been swung in or out and then locked in position.

The spring 31 rotates on its axis 32 which passes through the holes 26. The springs 31 rotate by reason of their contact with the soil when the mechanism is pushed forward. The soil is broken and mulched as it passes between the coils of the spring; and the weeds, over and through which the spring passes, are taken out by the auger-like action of the spring; and the soil is moved along by the auger-like action of the spring; and the entire surface over which the spring 31 passes when in a position as illustrated in Fig. 4 is mulched and cultivated. This is accomplished by the angle at which the spring is set. In the event that the spring 31 was at right angles with the line of travel there would be much of the soil escaping the action of the springs and many weeds would remain unaffected. The angle at which the spring 31 is set in Fig. 4 insures complete coverage of the soil between the coils of the spring. The auger-like action of the spring made of a wire of small diameter is to be contrasted from the auger-like action which is secured by a spiral made of a material which is solid from the axis to the outer edge of the auger. Sheet metal is frequently used to secure such an auger. In working the soil an auger of this type would roll the soil over for the entire depth of the penetration of said auger from the surface of the soil and the surface of said auger would accumulate moist soil so as to hinder and retard the operation of the unit and would turn the soil over so that the dry soil would be covered and the moist soil would be brought to the surface. The weeds are removed by spring 31 by reason of the auger-like motion of the spring and by reason of the side thrust of the spring, which is secured by the angle at which the spring is set. The spring 31 is made of tempered spring steel and is permitted to move slightly along the axis 32 in the holes 26. The contraction or compression of the spring and the expansion of the spring, together with the sliding axle 32 in hole 26, together with the narrow surface of spring 31 and the material of which it is made, plus the vibration that is set up in the spring in operating enables the spring to throw off any soil accumulation and permits it to operate as a clean and smooth tool in the soil. The small diameter of the wire of which spring 31 is made occasions the spring 31 to lift the soil through which it passes only a slight distance, to wit: the diameter of the wire. As the spring passes through the soil the soil is raised the distance of the diameter of the spring and then dropped back without a turn-over action. The axle 32 on spring 31 is obtained by bending the spring material inward from the outside circumference to the center of the spring and then bending the wire of which spring 31 is made out as to form an axis at both ends of the spring 31, as is shown in Fig. 6 and Fig. 7. The angle which the spring 31 forms with the line of travel of the entire mechanism is determined by the extensions 27 and 29. In the Fig. 1, Fig. 2, and Fig. 4, the springs are set at approximately a 30° angle with the line of travel. Although this angle is fixed by extensions 27, it may be changed by the operator, who for some reason may want a little different type of cultivation, but the angle at which the springs 31 appear in Fig. 1, Fig. 2, and Fig. 4 are approximately the angle at which the best results are obtained. The angle is fixed so that an operator will not be confused in making an adjustment. It is intended by your petitioner that springs similar to 31, made of wire of greater or less diameter, and made of wire of different shapes, and springs of greater or less diameter, and springs of greater or less length, given a similar adjustment and attachment on other carrying frames, may be used for hand-propelled and power-propelled units.

Fig. 8 represents a cross section of the wire of which spring 31 is fabricated. The narrowness of the wire permits penetration of the soil with a very slight downward pressure required for that purpose and due to the smooth diameter of said wire and due to its completely rounded surface.

Fig. 9 represents a cross section of a square wire of which said springs 31 may be made with the point of the square of said wire penetrating the soil and points to the side forming a cutting edge.

Fig. 10—35 represents the cross section of a rectangular wire which may be used in making the spring 31 presenting the narrow edge to the soil, and which rectangular wire 35 in the fabrication of spring 31 should be wound so as to form the outer rim of a concave plane, thus assisting in the penetration of the soil.

Fig. 11, in which appears 36, is a cross section of a triangular wire which may be used to fabricate the spring 31 and presenting to the soil surface the apex of the triangle, leaving the other angles of the triangle to cut sideways in the soil.

34 as appearing in Fig. 9, 35 as appearing in Fig. 10, 36 as appearing in Fig. 11, will enable quicker and easier penetration of difficult soils and will permit faster cutting or removal of weeds and will remove larger weeds than the round wire appearing in Fig. 8. The wire forms appearing in Fig. 8, Fig. 9, Fig. 10, and Fig. 11 will cultivate the soil over and through which they pass without turning the soil over and will leave the dry soil on top and the moist soil below and will practically eliminate the severance of roots on the plants; and the contraction or compression of the spring formed by the wires whose cross sections appear in Fig. 8, Fig. 9, Fig. 10, and Fig. 11, and the expansion thereof, together with the sliding axle 32 in holes 26, together with the narrow surfaces of said wires and the tempered spring steel of which they are made, plus the vibration that is set up in the spring in operating, enables the springs made of the wire forms shown in Fig. 8, Fig. 9, Fig. 10, and Fig. 11 to throw off any soil accumulation and permits them to operate as a clean and smooth tool in the soil.

Fig. 12 represents a portion of a coil which may be used in spring 31. The bend in the wire of a V-shape projects outward from the curved surface of the coil of the spring and is for the purpose of securing and aiding in the rotation of such spring in especially loose soils, and is for the purpose of penetrating and breaking up hard surfaces on soil. Similar bends could be made in wires whose cross sections are shown in Fig. 8, Fig. 9, Fig. 10, and Fig. 11, and in wires similar thereto.

Fig. 13 represents a portion of an arc of the coil of spring 31 in which the wire of said spring 31 is made is bent to the side, lying flat along the curved surface of said spring, giving the spring a larger tread, which is for the purpose of preventing if necessary penetration of too great a depth in loose soils. Similar bends in the wire of which spring 31 is made could be made in the wires whose cross sections appear in Fig. 8, Fig. 9, Fig. 10, and Fig. 11, and shapes similar thereto.

The projections 32 constituting the axis of said spring 31 may be threaded and thereon placed nut 37, which will prevent the axis 32 from pulling out of the holes 26 and at the same time permitting a slight sliding movement on the axis 32 of the spring 31 when the spring is in operation and in the event that the sliding movement on the axis on the spring 31 should, for the proper operation of the mechanism, be restricted, washer 38 may be placed over the axis 32 and against the outside surface of the extensions 24 and 25. Additional washers may be added as required.

I claim:

1. In a cultivator, in combination, a frame, an inverted U-shaped bracket consisting of two extending arms and a cross bar connecting said arms adapted to be carried by said frame in several positions, projections secured to the cross bar of said bracket and extending from said cross bar in an opposite direction than the arms of said bracket, each projection being secured to said bracket in a different relationship and adapted to be removably secured to said frame to dispose said bracket in a definite position with respect to said frame, said bracket having an opening in each of its extending arms disposed on a common axis, a ground working tool formed of resilient material in the shape of a helical coil having its opposite ends disposed on a horizontal axis through its center of rotation, the opposite ends of said tool being loosely journaled in the openings in the arms of said bracket, the opposite ends of said tool extending beyond the outer limits of the arms of said bracket, and securing means mounted adjacent the outer limits of the ends of said tool and spaced from the arms of said bracket to permit rotational and axial movement of said tool within said bracket.

2. In a cultivator, in combination, a frame, two inverted U-shaped brackets each consisting of two extending arms and a cross bar adapted to be carried by said frame in several positions, two projections secured to each cross bar of said brackets at the ends thereof and extending in an opposite direction than the arms of said brackets with the projection at one end of each cross bar disposed at a different angle in relation to said cross bar than the projection at the other end of the same cross bar, said brackets being adapted to be removably secured to said frame at the same time by projections disposed at the same angle, the extending arms of each bracket having aligned openings, a spring steel helical coil having its opposite ends disposed on a horizontal axis through its center of rotation carried between the extending arms of each bracket, the opposite ends of each coil being loosely journaled in the openings in the arms of each bracket, the opposite ends of each coil extending beyond the outer limits of the arms of the respective bracket by which it is carried, and securing means mounted adjacent the outer limits of the ends of each coil and spaced from the arms of each bracket to permit rotational and axial movement of said coil within said bracket.

3. A cultivator for row crops, comprising a wheeled frame, a pair of inverted U-shaped supporting members mounted on said frame in laterally spaced side-by-side relationship, a pair of ground working tools consisting of spring steel helical coils of high flexibility formed with the turns of the coils in spaced relationship with each other and with the opposite ends of the coils disposed on a horizontal axis extending through the center of the respective coils, each of said coils adapted for mounting on the wheeled frame at diverging angles to the path of movement of the frame for disposition on either side of one crop row and between two adjacent crop rows, and adjustable means loosely journaling the opposite ends of each of the coils to the respective supporting members permitting rotary movement of each coil about its axis and adjustable longitudinal and wobbling movement of all or a portion of the turns thereof within the limits of the arms of the supporting member according to the condition which the coils encounter in the soil and without possible injury to plants in any of the crop rows.

4. A cultivator for row crops, comprising a wheeled frame, a pair of inverted U-shaped supporting members mounted on said frame in laterally spaced side-by-side relationship, the outer end of each portion of said members found with an opening therein, a pair of ground working tools consisting of spring steel helical coils of high flexibility formed with the turns of the coils in spaced relationship to each other and with the opposite ends of the coils disposed on a horizontal axis through the center of the respective coils, the opposite ends of each coil extending through and journaled in the openings in the extensions of the supporting members and with the outer ends extending beyond the outer limits of said members, each of said coils adapted for mounting on the wheeled frame at diverging angles to the path of movement of the frame for disposition on either side of one crop row and between two adjacent crop rows, and adjustable means for securing the opposite ends of each of the coils to the respective supporting member to permit rotary movement of the coil about its ends and adjustable longitudinal and wobbling movement of all or a portion of the turns with respect to the supporting member according to the condition which the coils encounter in the soil without possible injury to plants in any of the crop rows.

References Cited in the file of this patent

UNITED STATES PATENTS

| | | |
|---|---|---|
| 375,364 | La Dow | Dec. 27, 1887 |
| 701,512 | Scott | June 3, 1902 |
| 901,221 | Watson | Oct. 13, 1908 |
| 1,788,165 | Lienhart | Jan. 6, 1931 |
| 1,908,377 | Mael | May 9, 1933 |

FOREIGN PATENTS

| | | |
|---|---|---|
| 249,960 | Germany | Aug. 2, 1912 |